United States Patent

Sindhushayana et al.

[11] Patent Number: 6,064,678
[45] Date of Patent: May 16, 2000

[54] METHOD FOR ASSIGNING OPTIMAL PACKET LENGTHS IN A VARIABLE RATE COMMUNICATION SYSTEM

[75] Inventors: Nagabhushana T. Sindhushayana; Roberto Padovani, both of San Diego, Calif.

[73] Assignee: QUALCOMM Incorporated, San Diego, Calif.

[21] Appl. No.: 08/965,705

[22] Filed: Nov. 7, 1997

[51] Int. Cl.[7] ........................................ H04J 3/22
[52] U.S. Cl. ............................. 370/470; 370/332
[58] Field of Search .................... 370/470, 320, 370/328, 329, 335, 338, 342, 349, 350, 441, 332, 333, 336; 455/522, 466, 510, 450, 464, 9, 11.1, 507, 509, 511, 515, 525, 550, 560, 561, 95, 103; 375/200, 203, 225, 246

[56] References Cited

U.S. PATENT DOCUMENTS

| | | | |
|---|---|---|---|
| 5,307,351 | 4/1994 | Webster | 370/94.1 |
| 5,355,516 | 10/1994 | Herold et al. | 455/510 |
| 5,396,516 | 3/1995 | Padovani et al. | 370/465 |
| 5,442,625 | 8/1995 | Gitlin et al. | 370/468 |
| 5,488,610 | 1/1996 | Morley | 370/539 |
| 5,511,073 | 4/1996 | Padovani et al. | 370/82 |
| 5,721,762 | 2/1998 | Sood | 455/466 |
| 5,729,540 | 3/1998 | Wegrzyn | 370/336 |
| 5,781,583 | 7/1998 | Bruckert et al. | 370/342 |
| 5,796,757 | 8/1998 | Czaja | 714/789 |
| 5,844,899 | 12/1998 | Daley et al. | 370/342 |
| 5,854,786 | 12/1998 | Henderson et al. | 370/335 |
| 5,859,840 | 1/1999 | Tiedemann, Jr. et al. | 370/335 |
| 5,884,187 | 3/1999 | Ziv et al. | 455/522 |
| 5,903,844 | 5/1999 | Bruckert et al. | 455/456 |
| 5,933,803 | 8/1999 | Ojala | 704/223 |
| 5,940,384 | 8/1999 | Carney et al. | 370/335 |

FOREIGN PATENT DOCUMENTS

| | | |
|---|---|---|
| 2311703 | 10/1997 | United Kingdom . |
| 9716046 | 5/1997 | WIPO . |

OTHER PUBLICATIONS

Wu, et al. "Improving Access Delay Fairness of DQDB MANs Under Overload Condition" Computer Communications 19(6): 571–579 (Jun. 1996).

*Primary Examiner*—Dang Ton
*Assistant Examiner*—Phirin Sam
*Attorney, Agent, or Firm*—Philip R. Wadsworth; Roger W. Martin; Kent D. Baker

[57] ABSTRACT

A method for assigning optimal packet lengths in a variable rate communication system capable of data transmission at one of a plurality of data rates. The packet lengths for the data rates are selected such that the maximum throughput rate is achieved while conforming to a fairness criteria. The fairness criteria can be achieved by restricting the packet length assigned to each data rate to a range of value, or $L_i^{min} \leq L_i \leq L_i^{max}$. The packet lengths for all data rates are first initialized to the maximum packet lengths for those data rates. Then, for each data rate, a determination is made whether another packet length assignment would result in improved throughput rate. If the answer is yes, the packet length for this data rate is reassigned and the throughput rate with the updated packet length assignments is recomputed. The process is repeated for each data rate until all data rates have been considered. The throughput rate can be calculated using a probabilistic model or a deterministic model.

16 Claims, 3 Drawing Sheets

METHOD FOR ASSIGNING OPTIMAL PACKET LENGTHS IN A VARIABLE RATE COMMUNICATION SYSTEM

BACKGROUND OF THE INVENTION

I. Field of the Invention

The present invention relates to communications. More particularly, the present invention relates to a method for assigning optimal packet lengths in a variable rate communication system.

II. Description of the Related Art

The use of code division multiple access (CDMA) modulation techniques is one of several techniques for facilitating communications in a system with a large number of users. Although other techniques such as time division multiple access (TDMA), frequency division multiple access (FDMA), and AM modulation schemes such as amplitude companded single sideband (ACSSB) are known, CDMA has significant advantages over these other techniques. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," and assigned to the assignee of the present invention and incorporated by reference herein. The use of CDMA techniques in a multiple access communication system is further disclosed in U.S. Pat. No. 5,103,459, entitled "SYSTEM AND METHOD FOR GENERATING SIGNAL WAVEFORMS IN A CDMA CELLULAR TELEPHONE SYSTEM", assigned to the assignee of the present invention and incorporated by reference herein. The CDMA system can be designed to conform to the "TIA/EIA/IS-95 Mobile Station-Base Station Compatibility Standard for Dual-Mode Wideband Spread Spectrum Cellular System", hereinafter referred to as the IS-95 standard. Another code division multiple access communication system includes the GLOBALSTAR communication system for world wide communication utilizing low earth orbiting satellites.

CDMA communication systems are capable of transmitting traffic data and voice data over the forward and reverse links. A method for transmitting traffic data in code channel frames of fixed size is described in detail in U.S. Pat. No. 5,504,773, entitled "METHOD AND APPARATUS FOR THE FORMATTING OF DATA FOR TRANSMISSION", assigned to the assignee of the present invention and incorporated by reference herein. In accordance with the IS-95 standard, the traffic data or voice data is partitioned into code channel frames which are 20 msec in duration. The data rate of each code channel frame is variable and can be as high as 14.4 Kbps.

A significant difference between voice services and data services is that the former requires a fixed and common grade of service (GOS) for all users. Typically, for digital systems providing voice services, this translates into a fixed (and guaranteed) data rate for all users and a maximum tolerable value for the error rates of the speech frames, independent of the link resource. For the same data rate, a higher allocation of resource is required for users having weaker links. This results in an inefficient use of the available resource. In contrast, for data services, the GOS can be different from user to user and can be a parameter optimized to increase the overall efficiency of the data communication system. The GOS of a data communication system is typically defined as the total delay incurred in the transfer of a data message.

Another significant difference between voice services and data services is the fact that the former imposes stringent and fixed delay requirements. Typically, the overall one-way delay of speech frames must be less than 100 msec. In contrast, the data delay can become a variable parameter used to optimize the efficiency of the data communication system.

The parameters which measure the quality and effectiveness of a data communication system are the total delay required to transfer a data packet and the average throughput rate of the system. Total delay does not have the same impact in data communication as it does for voice communication, but it is an important metric for measuring the quality of the data communication system. The average throughput rate is a measure of the efficiency of the data transmission capability of the communication system.

Given the growing demand for wireless data applications, the need for very efficient wireless data communication systems has become increasingly significant. An exemplary communication system which is optimized for data transmission is described in detail in copending U.S. patent application Ser. No. 08/963,386, entitled "METHOD AND APPARATUS FOR HIGH RATE PACKET DATA TRANSMISSION", filed Nov. 3, 1997, assigned to the assignee of the present invention, and incorporated by reference herein. The system disclosed in U.S. patent application Ser. No. 08/963,386 is a variable rate communication system capable of transmitting at one of a plurality of data rates. The data rate is selected in accordance with the link between the transmitting base station and the receiving remote station. The transmitting base station is selected from among all base stations in communication with the remote station based on the links from the base stations to the remote station. The selected base station transmits to the remote station for a predetermined duration of time which is referred to as a time slot. Since the data rate is known and the time slot is fixed, the packet length (or the number of transmitted bits within the time slot) can be computed.

Transmitting from the best base station at all times to the highest rate user results in the highest throughput rate possible in a variable rate communication system. However, this scheme suffers from lack of fairness, in the sense that all but the highest data-rate users get a very poor quality of service. A policy that is both fair and efficient favors the higher rate users by awarding them a larger number of contiguous time slots as compared to lower data rate users, but ensures that even the lowest data rate users get a reasonable share of the system throughput. As stated above, a parameter which measures the quality of the communication system is the total delay experienced by all users. A method is required to assign the packet length, or the time slot, for each data rate such that the throughput rate is maximized while maintaining a level of fairness.

SUMMARY OF THE INVENTION

The present invention is a novel and improved method for assigning optimal packet lengths in a variable rate communication system. The variable rate communication system is capable of data transmission at one of a plurality of data rates. Each data transmission occurs over a predetermined duration of time. For a given transmission rate $R_i$ and duration of time $T_i$, the packet length $L_i$ (or the number of bits transmitted during time $T_i$) can be computed as $L_i = R_i \cdot T_i$. In the present invention, the packet lengths $L_i$ are assigned such that the system goal of maximum throughput rate is achieved while conforming to a fairness criteria.

It is an object of the present invention to assign packet lengths to all data rates to maximize the system throughput rate while maintaining a level of fairness. In the exemplary embodiment, the fairness criteria is related to the total delay experienced by users of all data rates and is selected by restricting the size of the packet length assigned to each data rate to a range of value, or $L_i^{min} \leq L_i \leq L_i^{max}$. In the exemplary embodiment, the packet length $L_i$ for each data rate is first initialized to the maximum packet length $L_i^{max}$ for that data rate. Then, for each data rate, a determination is made whether changing the packet length from $L_i^{max}$ to $L_i^{min}$ would result in improved throughput rate. If the answer is yes, the packet length for this data rate is reassigned and the throughput rate with the updated packet length assignments is recomputed. The process is repeated for each data rate until all data rates have been considered.

It is another object of the present invention to assign a packet length $L_i$ to each data rate in a variable rate communication system in accordance with a probabilistic model or a deterministic model. For the probabilistic model, the probability of data transmission at each of the plurality of data rates is computed. In the exemplary embodiment, the probability can be computed using the carrier-to-interference ratio (C/I) profile and the energy-per-bit-to-noise ratio ($E_b/N_0$) of the system. The probabilities for all data rates are used in assigning the packet lengths for all data rates. For the deterministic model, the number of users receiving at each data rate is tabulated and used to assign the packet lengths. The deterministic model allows the variable rate communication system to dynamically assign the packet lengths based on changes in the system, and can result in improved performance.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

I. System Description

Figure 1:
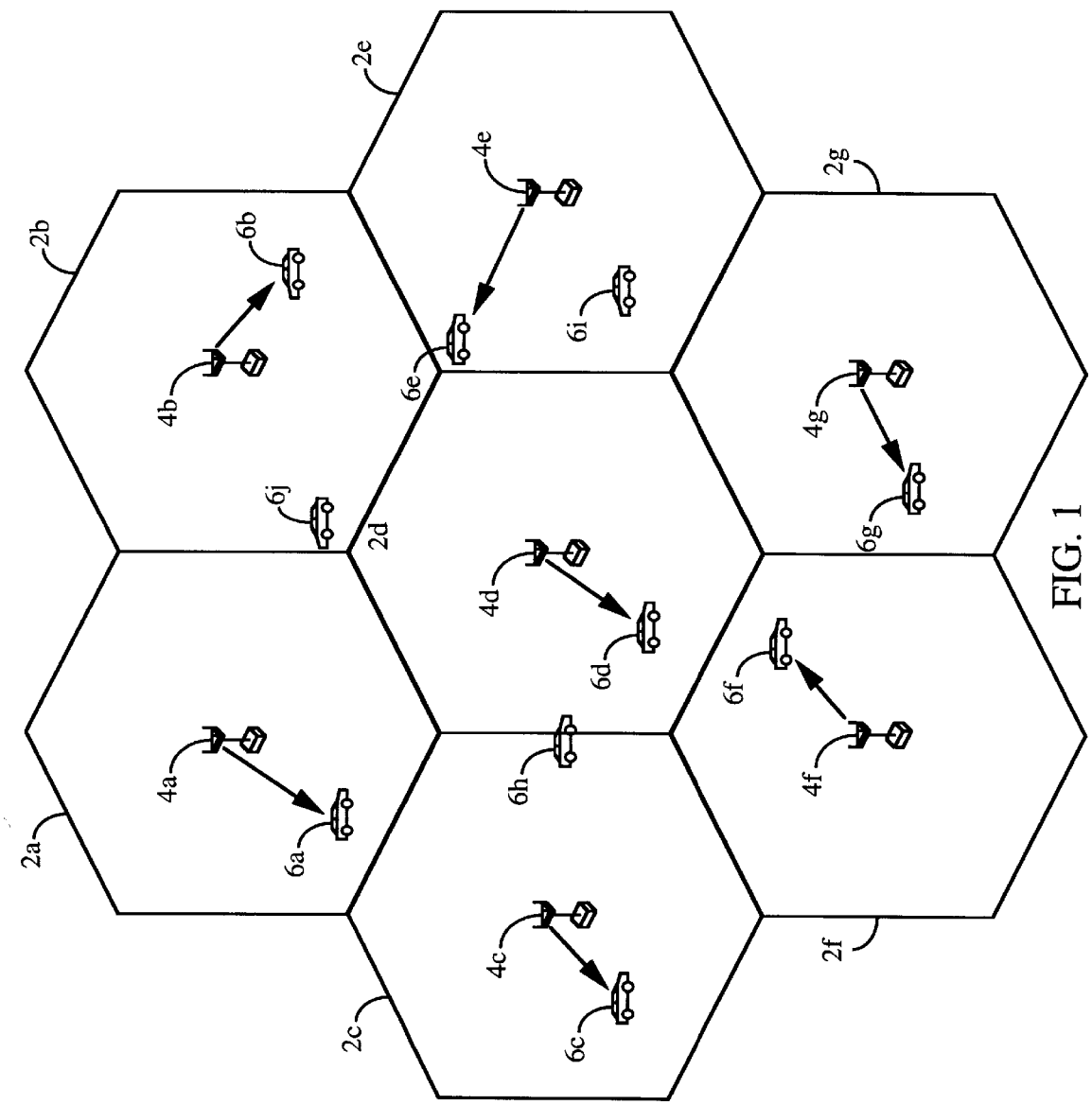
FIG. 1 is a diagram of an exemplary variable rate communication system.

Referring to the figures, FIG. 1 represents an exemplary variable rate communication system. One such system is described in the aforementioned U.S. patent application Ser. No. 08/963,386. The variable rate communication system comprises multiple cells $2a$–$2g$. Each cell 2 is serviced by a corresponding base station 4. Various remote stations 6 are dispersed throughout the communication system. In the exemplary embodiment, each of remote stations 6 communicates with at most one base station 4 on the forward link at each time slot. For example, base station 4a transmits data exclusively to remote station 6a, base station 4b transmits data exclusively to remote station 6b, and base station 4c transmits data exclusively to remote station 6c on the forward link at time slot n. As shown by FIG. 1, each base station 4 preferably transmits data to one remote station 6 at any given moment. In addition, the data rate is variable and is dependent on the carrier-to-interference ratio (C/I) as measured by the receiving remote station 6 and the required energy-per-bit-to-noise ratio ($E_b/N_0$). The reverse link from remote stations 6 to base stations 4 is not shown in FIG. 1 for simplicity.

Figure 2:
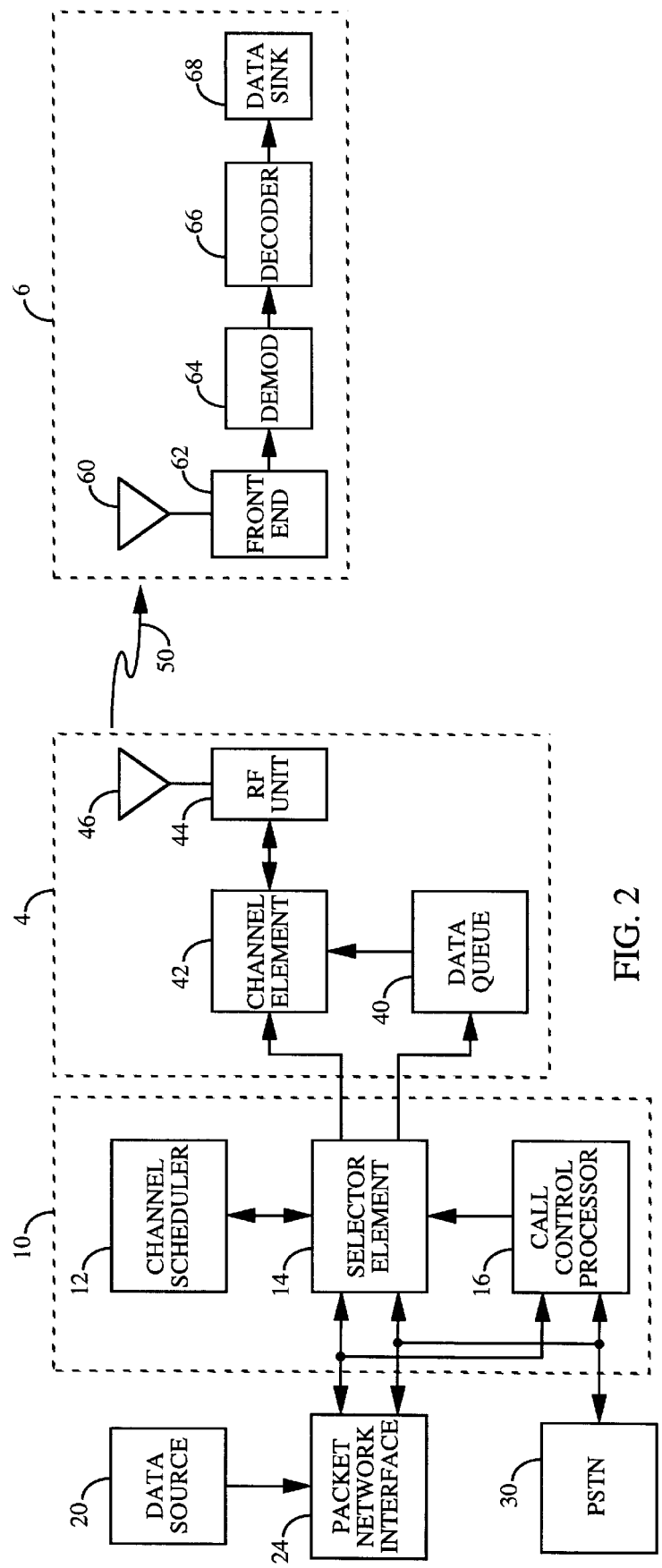
FIG. 2 is a block diagram illustrating the basic subsystems of an exemplary variable rate communication system.

A block diagram illustrating the basic subsystems of an exemplary variable rate communication system is shown in FIG. 2. Base station controller 10 interfaces with packet network interface 24, PSTN 30, and all base stations 4 in the communication system (only one base station 4 is shown in FIG. 2 for simplicity). Base station controller 10 coordinates the communication between remote stations 6 in the communication system and other users connected to packet network interface 24 and PSTN 30. PSTN 30 interfaces with users through the standard telephone network (not shown in FIG. 2).

Base station controller 10 contains many selector elements 14, although only one is shown in FIG. 2 for simplicity. One selector element 14 is assigned to control the communication between one or more base stations 4 and one remote station 6. If selector element 14 has not been assigned to remote station 6, call control processor 16 is informed of the need to page remote station 6. Call control processor 16 then directs base station 4 to page remote station 6.

Data source 20 contains the large amount of data which is to be transmitted to remote station 6. Data source 20 provides the data to packet network interface 24. Packet network interface 24 receives the data and routes the data to selector element 14. Selector element 14 sends the data to each base station 4 in communication with remote station 6. In the exemplary embodiment, each base station 4 maintains data queue 40 which contains the data to be transmitted to remote station 6.

The data is sent, in data packets, from data queue 40 to channel element 42. In the exemplary embodiment, on the forward link, a data packet refers to a fixed amount of data to be transmitted to the destination remote station 6 within one time slot. For each data packet, channel element 42 inserts the necessary control fields. In the exemplary embodiment, channel element 42 CRC encodes the data packet and control fields and inserts a set of code tail bits. The data packet, control fields, CRC parity bits, and code tail bits comprise a formatted packet. In the exemplary embodiment, channel element 42 then encodes the formatted packet and interleaves (or reorders) the symbols within the encoded packet. In the exemplary embodiment, the interleaved packet is scrambled with a long PN code, covered with a Walsh cover, and spread with the short $PN_I$ and $PN_Q$ codes. The spread data is provided to RF unit 44 which quadrature modulates, filters, and amplifies the signal. The forward link signal is transmitted over the air through antenna 46 on forward link 50.

At remote station 6, the forward link signal is received by antenna 60 and routed to a receiver within front end 62. The receiver filters, amplifies, quadrature demodulates, and quantizes the signal. The digitized signal is provided to demodulator (DEMOD) 64 where it is despread with the short $PN_I$ and $PN_Q$ codes, decovered with the Walsh cover, and descrambled with the long PN code. The demodulated data is provided to decoder 66 which performs the inverse of the signal processing functions done at base station 4, specifically the de-interleaving, decoding, and CRC check functions. The decoded data is provided to data sink 68.

The hardware, as described above, supports variable rate transmissions of data, messaging, voice, video, and other communications over the forward link. Other hardware architecture can be designed to support variable rate transmissions and are within the scope of the present invention. The reverse link is not shown nor described for simplicity. The present invention can be readily extended to cover variable rate transmissions on the reverse link.

Channel scheduler 12 connects to all selector elements 14 within base station controller 10. Channel scheduler 12 schedules the variable rate transmissions on the forward link. Channel scheduler 12 receives the queue size, which is indicative of the amount of data to transmit to remote station 6, and messages from remote stations 6. Channel scheduler 12 schedules data transmissions to achieve the system goal of maximum data throughput while conforming to fairness a constraint.

As shown in FIG. 1, remote stations 6 are dispersed throughout the communication system and can be in communication with zero or one base station 4 on the forward link. In the exemplary embodiment, channel scheduler 12 coordinates the forward link data transmissions over the entire communication system. A scheduling method and apparatus for high speed data transmission are described in detail in U.S. patent application Ser. No. 08/798,951, entitled "METHOD AND APPARATUS FOR FORWARD LINK RATE SCHEDULING", filed Feb. 11, 1997, assigned to the assignee of the present invention and incorporated by reference herein.

II. Calculating Throughput Rate

For a variable rate communication system wherein the data rate is a random variable taking discrete values $R_1, R_2, R_3, \ldots, R_N$ with positive probabilities $p_1, p_2, p_3, \ldots, p_N$, respectively, the average throughput rate C of the system (in bits per second) can be calculated as:

$$C = \frac{\sum_{i=1}^{N} p_i L_i}{\sum_{i=1}^{N} p_i T_i} = \frac{\sum_{i=1}^{N} p_i L_i}{\sum_{i=1}^{N} p_i \left(\frac{L_i}{R_i}\right)}, \quad (1)$$

where $L_i$ is the packet length and is computed as $L_i = R_i \cdot T_i$. The calculation in equation (1) is based on a static and probabilistic model for the communication system. The average throughput rate C can also be calculated using a dynamic and deterministic model as:

$$C = \frac{\sum_{i=1}^{N} N_i L_i}{\sum_{i=1}^{N} N_i T_i} = \frac{\sum_{i=1}^{N} N_i L_i}{\sum_{i=1}^{N} N_i \left(\frac{L_i}{R_i}\right)}, \quad (2)$$

where $N_i$ is the number of user within the communication system receiving at data rate $R_i$. The deterministic model with dynamic packet length assignment can result in improvement in the average throughput rate. Equations (1) and (2) are exemplary equations which can be used to calculate the throughput rate of the communication system. Other equations to calculate the throughput rate can also be used and are within the scope of the present invention.

For the probabilistic model, the throughput rate C can be calculated for two special cases. In the first case, if the packet lengths for all data rates are set equal, the throughput rate $C_L$ can be calculated as:

$$C_L = \frac{1}{\sum_{i=1}^{N} p_i \left(\frac{1}{R_i}\right)} = \frac{1}{E\left(\frac{1}{R}\right)}, \quad (3)$$

where $E(1/R)$ is the expected value of $(1/R)$. In the second case, if the duration of the time slots are set equal so that the packet length $L_i$ for data rate $R_i$ is proportional to the data rate, the throughput rate $C_T$ can be calculated as:

$$C_T = \sum_{i=1}^{N} p_i R_i = ER, \quad (4)$$

For any positive random variable X, it can be shown that $EX \cdot E(1/X) \geq 1$. Therefore, it follows that $C_L \leq C_T$. Note, however, that the equal $L_i$ scheme is "fairer" than the equal $T_i$ scheme because low rate users in the equal $L_i$ scheme have shorter total delays than low rate users in the equal $T_i$ scheme when attempting to receive the same amount of information (or the same number of bits).

The maximum possible throughput rate is achieved by a scheme in which the packet lengths of all data rates are zero ($L_i = 0$) except for the user having the highest data rate. In this case, the maximum throughput rate is equaled to the highest data rate, or $C_{max} = \max\{R_i : 1 \leq i \leq N\}$. However, this maximum throughput rate is achieved at an expense of fairness, wherein the base station serves only the highest rate users.

The relationship between the grade of service of the individual users and their packet lengths can be described as follows. First, consider a system which has $N_i$ users operating at data rate $R_i$. The mean time required to transmit a message of length $L_M$ bits to a user $U_i$ with data rate $R_i$ can be denoted as $EX_i$. If $L_M$ is an integral multiple of $L_i$, then $EX_i$ can be expressed as:

$$EX_i = \left(\frac{L_M}{L_i}\right) \sum_{k=1}^{N} N_k \left(\frac{L_k}{R_k}\right). \quad (5)$$

Equation (5) results from the fact that base station 4 transmits a message of length $L_M$ bits to user $U_i$ in $$\left(\frac{L_M}{L_i}\right)$$

separate installments, of length $L_i$ bits each. Between successive data tranmissions of $L_i$ bits to user $U_i$, base station 4 serves other users in the system. For each user $U_k$ served, base station 4 transmits for an amount of time equaling $L_k/R_k$, where $L_k$ and $R_k$ denote the packet length and data rate of user $U_k$, respectively. Equation (5) shows that the mean service time $EX_i$ is inversely proportional to the packet length $L_i$.

Using standard queuing models (e.g., M/D/1 queue with vacations), it can be shown that the mean delay $ED_i$ experienced by a message of length $L_M$ destined for user $U_i$ is given by the following expression:

$$ED_i = \frac{\rho_i EX_i}{2(1-\rho_i)} + \frac{1}{2} \sum_{k \neq i} \frac{L_k}{R_k} \quad (6)$$

-continued $$= \frac{\rho_i}{2(1-\rho_i)} \frac{L_M}{L_i} \sum_{1 \leq k \leq N} \frac{L_k}{R_k} + \frac{1}{2} \sum_{k \neq i} \frac{L_k}{R_k},$$

where $\rho_i$ denotes the traffic utilization factor of the link from base station 4 to user $U_i$. Typically, the traffic utilization factor falls within the range $0.5 \leq \rho_i \leq 0.9$. If the message length $L_M$ is much larger than the packet length $L_i$, which is typically true for many data communication systems, the second term in the above equation may be neglected. Equation (6) can then be approximated as:

$$ED_i \approx \frac{\rho_i EX_i}{2(1-\rho_i)} = \frac{\rho_i}{2(1-\rho_i)} \frac{L_M}{L_i} \sum_{k=1}^{N} \frac{L_k}{R_k}. \quad (7)$$

If the data links to all the users in the system operate at the same traffic utilization factor $\rho$, then it follows that the expected message delay for user $U_i$ is approximately inversely proportional to the packet length $L_i$. Therefore, if $ED_{min}$ and $ED_{max}$ denote the minimum and maximum expected delay of the users in the system, respectively, the following relationship holds:

$$\frac{ED_{max}}{ED_{min}} \approx \frac{L_{max}}{L_{min}}. \quad (8)$$

Hence, a certain amount of fairness can be achieved by specifying the upper and lower bound for the packet length $L_i$ assigned to each data rate. Thus, the packet lengths can be defined as:

$$L_i^{min} \leq L_i \leq L_i^{max} \text{ for each } 1 \leq i \leq N, \quad (9)$$

where $L_i^{min}$ is the minimum packet length for data rate $R_i$ and $L_i^{max}$ is the maximum packet length for data rate $R_i$. As an example, the packet lengths for all data rates can be defined as $L_i^{min} = L_0$ and $L_i^{max} = 2L_0$. This ensures that for the same amount of data, the expected delay for the lowest data rate is at most twice as long as the expected delay for the highest rate data. The constraint given in equation (9) describes the fairness of the system. As will be shown below, lower ratio of $L_{max}^i$ to $L_i^{min}$ denotes a fairer scheme at the expense of a lower throughput rate.

III. Assigning Optimal Packet Lengths

Optimal packet length assignments maximize the throughput rate C in equation (1) or (2) while conforming to the fairness constraint of equation (9). The throughput rate $C = C(L_1, L_2, \ldots, L_N)$ is an optimal solution if and only if for each $1 \leq k \leq N$, the following conditions are valid:

$$L_i = L_i^{min} \text{ whenever } R_i < C \quad (a)$$

$$L_i = L_i^{max} \text{ whenever } R_i < C \quad (b) \quad (10)$$

Thus, from equation (10), the optimal packet length assignment is such that for each data rate $R_i$, the optimal packet length assignment is $L_i^{min}$ if the data rate $R_i$ is less than the throughput rate C of the system and is $L_i^{max}$ if the data rate $R_i$ is greater than the throughput rate C. If the data rate $R_i$ is equal to the throughput rate C, any packet length assignment results in the same throughput rate.

To prove optimality, equation (1) can be differentiated with respect to the packet length variable $L_i$. The derivative can be expressed as:

$$\frac{\partial C}{\partial L_i} = \frac{p_i}{\sum_{k=1}^{N} p_k \left(\frac{L_k}{R_k}\right)} \left(1 - \frac{C}{R_i}\right), \quad (11)$$

Equation (11) can be used to show that conditions (a) and (b) in equation (10) are necessary for optimality. Equivalently, it can be shown that an assignment which violates conditions (a) or (b) in equation (10) cannot be optimal. Consider any index i. If $R_i < C$, then equation (11) implies that the derivative is less than zero, or $\partial C / \partial L_i < 0$. From the derivative $(\partial C / \partial L_i < 0)$, if the given packet length assignment is such that $L_i > L_i^{min}$, then C can be increased by decreasing $L_i$ by a small amount. Similarly, if $R_i > C$, then equation (11) implies that the derivative is greater than zero, or $\partial C / \partial L_i > 0$. From the derivative $(\partial C / \partial L_i > 0)$, if the given packet length assignment is such that $L_i < L_i^{max}$, then C can be increased by increasing $L_i$ by a small amount. It can also be shown that any packet length assignment which satisfy conditions (a) and (b) in equation (10) is guaranteed to be optimal.

IV. Optimal Packet Length Assignment Routine

Figure 3:
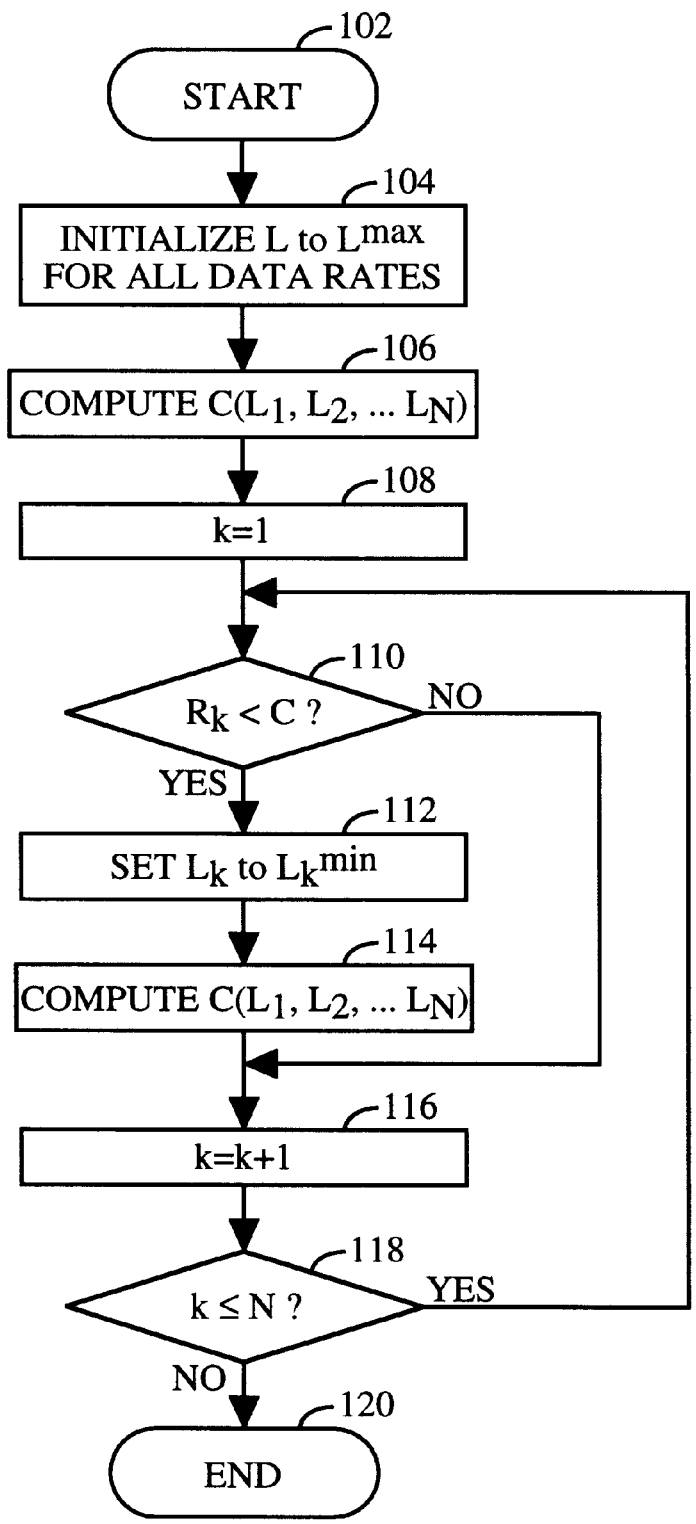
FIG. 3 is an exemplary flow diagram of an optimal packet length assignment routine of the present invention.

A flow diagram of an optimal packet length assignment routine is shown in FIG. 3. The routine starts at block 102. In the first step, at block 104, the packet lengths L for all data rates are initialized to the maximum packet lengths $L^{max}$ for those data rates. At block 106, the throughput rate C using the packet lengths assigned in block 104 is computed using equation (1) or (2). At block 108, the loop variable k is initialized to 1 and the routine enters a loop. The loop assigns minimum packet lengths to lower data rates to optimize the throughput rate while maintaining the fairness constraint which is defined by the minimum packet length $L_k^{min}$ and the maximum packet length $L_k^{max}$ for each data rate.

In the first step within the loop, at block 110, the data rate $R_k$ is compared against the throughput rate C computed in block 106. If data rate $R_k$ is greater than or equal to the throughput rate C, the routine jumps to block 116. Otherwise, if data rate $R_k$ is lower than the throughput rate C, the routine proceeds to block 112 which assigns the packet length $L_k$ to the minimal packet length $L_k^{min}$ for this data rate $R_k$. At block 114, the throughput rate C is recomputed using the updated packet length assignments. At block 116, the loop variable k is incremented. The loop proceeds to block 118 where k is compared against N which denotes the number of data rates available in the system. If $k \leq N$, indicating that all data rates have not been considered, the loop returns to block 110 and the next data rate is considered. Otherwise, the routine terminates at block 120.

For the routine illustrated in FIG. 3, the data rates do not need to be arranged in any particular order. All data rates are individually considered and its impact on the throughput rate is computed. In this routine, the last computed value for the throughput rate C is the maximum throughput rate of the system which satisfies the fairness criteria as defined by the minimum and maximum packet lengths $L_k^{min}$ and $L_k^{max}$ selected for each data rate.

An example of the optimal packet length assignment routine is illustrated below. In this example, the variable rate communication system comprises eight data rates and has the probability distribution as illustrated in Table 1. For example, the system has a probability of 0.01 of transmitting at the 38.4 Kbps data rate, a probability of 0.11 of transmitting at the 76.8 Kbps data rate, a probability of 0.13 of transmitting at the 153.6 Kbps data rate, and so on. This probability distribution can be obtained from the carrier-tointerference ratio (C/I) profile and the energy-per-bit-to-noise ratio ($E_b/N_0$) of the system as described in the aforementioned U.S. patent application Ser. No. 08/963,386.

In this example, assigning the same packet length to all data rates results in a throughput rate $C_L=1/E(1/R)=258.629$ Kbps. Alternatively, assigning the same time slot duration to all data rates, or choosing packet lengths directly proportional to the data rates, results in a throughput rate $C_T=E(R)=642.816$ Kbps. However, for the equal time slot scheme, the lowest data rate user may have to wait 30 times longer (1.152 Mbps/38.4 Kbps) than the highest rate user to receive the same amount of data from the transmitting source.

In the present example, the fairness constraint is selected such that the packet lengths of all data rates are between 1024 and 2048 bits, or requiring that $1024 \leq L_i \leq 2048$ bits, for all i=1, 2, ..., 8. This fairness constraint ensures that the idle time of the lowest rate user is at most twice as long as that for the highest rate user for the same number of received bits.

TABLE 1

| Index i | Data Rate $R_i$ (Kbps) | Probability $p_i$ |
|---|---|---|
| 1 | 38.4 | 0.01 |
| 2 | 76.8 | 0.11 |
| 3 | 153.6 | 0.13 |
| 4 | 307.2 | 0.12 |
| 5 | 384.0 | 0.11 |
| 6 | 614.4 | 0.07 |
| 7 | 960.0 | 0.09 |
| 8 | 1152.0 | 0.36 |

To assign the optimal packet length for each data rate to maximize the throughput rate while maintaining the above fairness constraint, the method described in FIG. 3 can be followed. Initially, the packet lengths for all data rates are assigned to 2048 (block 104) and the throughput rate, denoted as $C_0$, for this assignment is computed using equation (1) (block 106). The result is tabulated in Table 2. For each data rate, the data rate $R_k$ is compared against the most recent computed throughput rate C and, if data rate $R_k$ is less than the throughput rate C, the packet length $L_k$ corresponding to this data rate $R_k$ is reassigned the minimum packet length $L_k^{min}$ for this data rate. The throughput rate C is then recomputed. For example, the first data rate $R_1$ is compared against the throughput rate $C_0$ (block 110). Since $R_1$ is less than $C_0$, the packet length $L_1$ for data rate $R_1$ is set to $L_1^{min}$ or 1024 (block 112). Next, the throughput rate $C_1$ with the updated packet length assignments is recomputed using equation (1) (block 114). In this case, $C_1$=266.304 Kbps and is greater than $C_0$ to reflect the increase in the throughput rate as the result of reassigning $L_1$ to 1024 bits. Next, the second data rate $R_2$ is compared against the throughput rate $C_1$. Since $R_2$ is less than $C_1$, the packet length $L_2$ for data rate $R_2$ is set to $L_2^{min}$ or 1024. Next, the throughput rate $C_2$ with the updated packet length assignments is recomputed using equation (1). In this case, $C_2$=311.239 Kbps and is greater than $C_1$ to reflect the increase in the throughput rate as the result of reassigning $L_2$ to 1024 bits. The process is repeated for the remaining rates until all data rates have been considered. The results for this example is illustrated in Table 2.

TABLE 2

| Index k | Data Rate $R_k$ (Kbps) | Throughput Rate $C_k$ (Kbps) | Packet Length $L_k$ (bits) |
|---|---|---|---|
| | | 258.629 | |
| 1 | 38.4 | 266.304 | 1024 |
| 2 | 76.8 | 311.239 | 1024 |
| 3 | 153.6 | 336.926 | 1024 |
| 4 | 307.2 | 348.799 | 1024 |
| 5 | 384.0 | 348.799 | 2048 |
| 6 | 614.4 | 348.799 | 2048 |
| 7 | 960.0 | 348.799 | 2048 |
| 8 | 1152.0 | 348.799 | 2048 |

Notice that the routine of the present invention reassigns the packet length for a data rate only if the reassignment results in a higher throughput rate while observing the fairness constraint. The routine does not require the data rates to be prearranged in an increasing order as shown in Table 2.

The optimal packet length assignments can also be computed using an alternative routine which minimizes the number of times the throughput rate C is computed. In the routine described above, the throughput rate is computed every time any packet length $L_i$ is changed from $L_i^{max}$ to $L_i^{min}$. In the alternative routine, the throughput rate C is computed for a given packet length assignment. After the throughput rate C has been computed, the packet lengths for all data rates $R_i<C$ is set to $L_i^{min}$. The throughput rate is C is then recomputed if one or more data rates R has not been considered. This alternative routine operates most efficiently if the data rates are pre-arranged in ascending order.

Although the minimum and maximum packet lengths $L_i^{min}$ and $L_i^{max}$ for all data rates are selected to be the same in the above example, this is not required. A system can comprise different minimum and maximum packet lengths and $L_i^{min}$ and $L_i^{max}$ for each data rate. In fact, the minimum and maximum packet lengths $L_i^{min}$ and $L_i^{max}$ for each data rate can be selected by consideration of the fairness factors as described in the aforementioned U.S. patent application Ser. No. 08/963,386. These fairness factors can comprise (1) the $E_b/N_0$ required by the receiving remote station, (2) the soft handoff status of the remote station, (3) the transmit energy-per-bit $E_b$ required, (4) the amount of data to be transmitted, (5) the type of data to be transmitted, (6) whether the transmission is a retransmission due to a prior erroneous reception, (7) the error rate of the remote station, (8) the amount of delay already experienced by the destination remote station, and (9) the priority of the remote station.

Although the present invention has been described in the context of a variable rate communication on the forward link, the inventive concept described herein can be extended to variable rate communication on the reverse link. In fact, the application of the present invention to any variable rate communication system is within the scope of the present invention.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A method for assigning packet lengths in a variable rate communication system comprising the steps of:

selecting a fairness criteria;

assigning each of a plurality of data rates in said communication system to an initial packet length assignment;

computing a throughput rate based on said initial packet length assignment;

reassigning packet lengths for selected data rates in conformance with said fairness criteria if said reassignments result in higher throughput rate.

2. The method of claim 1 wherein said selecting step comprises the step of:

selecting a minimum packet length and a maximum packet length for each of said plurality of data rates.

3. The method of claim 2 wherein said maximum packet length is twice said minimum packet length for each of said plurality of data rates.

4. The method of claim 2 wherein said minimum packet length and said maximum packet length are identical for all data rates.

5. The method of claim 4 wherein said maximum packet length is twice said minimum packet length for all data rates.

6. The method of claim 1 wherein said fairness criteria is based on a set of fairness factors.

7. The method of claim 1 wherein said fairness criteria is based on an expected delay for a lowest data rate and an expected delay for a highest data rate.

8. The method of claim 1 wherein said computing step is based on a probabilistic model.

9. The method of claim 1 wherein said computing step is based on a deterministic model.

10. The method of claim 1 wherein said initial packet length assignment comprises setting said packet length of each of said plurality of data rates to a maximum packet length for said data rate.

11. The method of claim 1 wherein said reassigning step comprises the steps of:

selecting a data rate from said plurality of data rates;

comparing said selected data rate against a most recently computed throughput rate;

setting a packet length of said selected data rate to a minimum packet length for said selected data rate if said selected data rate is lower than said most recently computed throughput rate;

recomputing said throughput rate after said setting step; and repeating said selecting, comparing, setting, and recomputing steps for all data rates in said plurality of data rates.

12. The method of claim 1 wherein said reassigning step comprises the steps of:

selecting a data rate from said plurality of data rates;

comparing said selected data rate against a most recently computed throughput rate;

setting a packet length of said selected data rate to a minimum packet length for said selected data rate if said selected data rate is lower than said most recently computed throughput rate;

repeating said selecting, comparing, and setting steps for all data rates in said plurality of data rates; and recomputing said throughput rate after said repeating step.

13. The method of claim 12 further comprising the step of:

ordering said plurality of data rates in an order of increasing data rates, said ording step interposed between said selecting step and said assigning step.

14. The method of claim 1 wherein said communication system comprises more than two data rates.

15. The method of claim 1 said wherein communication system comprises eight or more data rates.

16. A method for assigning packet lengths in a variable rate CDMA communication system comprising the steps of:

selecting a fairness criteria;

computing a throughput rate based on an initial packet length assignment for each of a plurality of data rates in said communication system;

reassigning packet lengths for selected data rates in conformance with said fairness criteria if said reassignments result in higher throughput rate.

* * * * *